United States Patent
Ueda

(10) Patent No.: US 12,340,496 B2
(45) Date of Patent: Jun. 24, 2025

(54) INSPECTION SYSTEM AND INSPECTION METHOD FOR SECONDARY BATTERY

(71) Applicant: KABUSHIKI KAISHA TOSHIBA, Tokyo (JP)

(72) Inventor: Kazuyoshi Ueda, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 296 days.

(21) Appl. No.: 17/818,439

(22) Filed: Aug. 9, 2022

(65) Prior Publication Data
US 2023/0065858 A1 Mar. 2, 2023

(30) Foreign Application Priority Data
Aug. 27, 2021 (JP) .................................. 2021-139069

(51) Int. Cl.
G06T 7/00 (2017.01)
G06T 7/90 (2017.01)
H01M 10/42 (2006.01)

(52) U.S. Cl.
CPC .............. *G06T 7/0004* (2013.01); *G06T 7/90* (2017.01); *H01M 10/4285* (2013.01); *G06T 2207/30108* (2013.01)

(58) Field of Classification Search
None
See application file for complete search history.

(56) References Cited

U.S. PATENT DOCUMENTS

| | | |
|---|---|---|
| 2010/0110173 A1 | 5/2010 | Kagawa |
| 2014/0227602 A1 | 8/2014 | Sumida et al. |

FOREIGN PATENT DOCUMENTS

| | | |
|---|---|---|
| CN | 103575737 A | 2/2014 |
| CN | 104956210 A | 9/2015 |
| CN | 107894430 A | 4/2018 |
| JP | 2004-020254 | 1/2004 |
| JP | 2004-20254 A | 1/2004 |
| JP | 2004-325346 A | 11/2004 |
| JP | 2006-267000 A | 10/2006 |
| JP | 2008-164336 | 7/2008 |
| JP | 2009-258069 A | 11/2009 |

(Continued)

OTHER PUBLICATIONS

Combined Chinese Office Action and Search Report issued Oct. 1, 2024 in Chinese Application 202210931536.X, (with unedited computer-generated English translation), 21 pages.

(Continued)

*Primary Examiner* — Bernard Krasnic
(74) *Attorney, Agent, or Firm* — Oblon, McClelland, Maier & Neustadt, L.L.P.

(57) ABSTRACT

According to one embodiment, an inspection system for a secondary battery includes an image sensor, a detector, and an inspection processor. The image sensor captures an image of a fiber layer of an electrode structure of a secondary battery. The electrode structure includes an electrode and the fiber layer formed on a surface of the electrode. The electrode includes a current collector and an active material layer. The detector detects a color in data of the image captured with the image sensor. The inspection processor inspects a pinhole defect in the fiber layer based on the color detected with the detector.

5 Claims, 8 Drawing Sheets

(56) References Cited

FOREIGN PATENT DOCUMENTS

| JP | 2010-25799 | A | | 2/2010 | |
|----|----|----|----|----|----|
| JP | 2012-204070 | | | 10/2012 | |
| JP | 2013-167596 | A | | 8/2013 | |
| JP | 2015-172519 | | | 10/2015 | |
| JP | 2015172519 | A | * | 10/2015 | |
| JP | 2016166813 | A | * | 9/2016 | ............. G01N 21/95 |
| JP | 2017-194425 | A | | 10/2017 | |
| JP | 2018-159146 | A | | 10/2018 | |
| JP | 2018170104 | A | * | 11/2018 | ........ H01M 10/0587 |
| JP | 2018179939 | A | * | 11/2018 | ......... G01N 21/8806 |
| JP | 2021-86792 | | | 6/2021 | |
| WO | WO 2013/179526 | A1 | | 12/2013 | |

OTHER PUBLICATIONS

Office Action mailed Apr. 8, 2025, in Japanese Application No. 2021-139069 filed Aug. 27, 2021 (w/English translation).

Office Action mailed Apr. 8, 2025, in Chinese Application No. 202210931536.X filed Aug. 4, 2022 (w/English translation).

Louis et al., "Engineering Mechanics", Beijing Technology University Press, pp. 57-58, Jan. 2017 (w/machine-generated English translation).

* cited by examiner

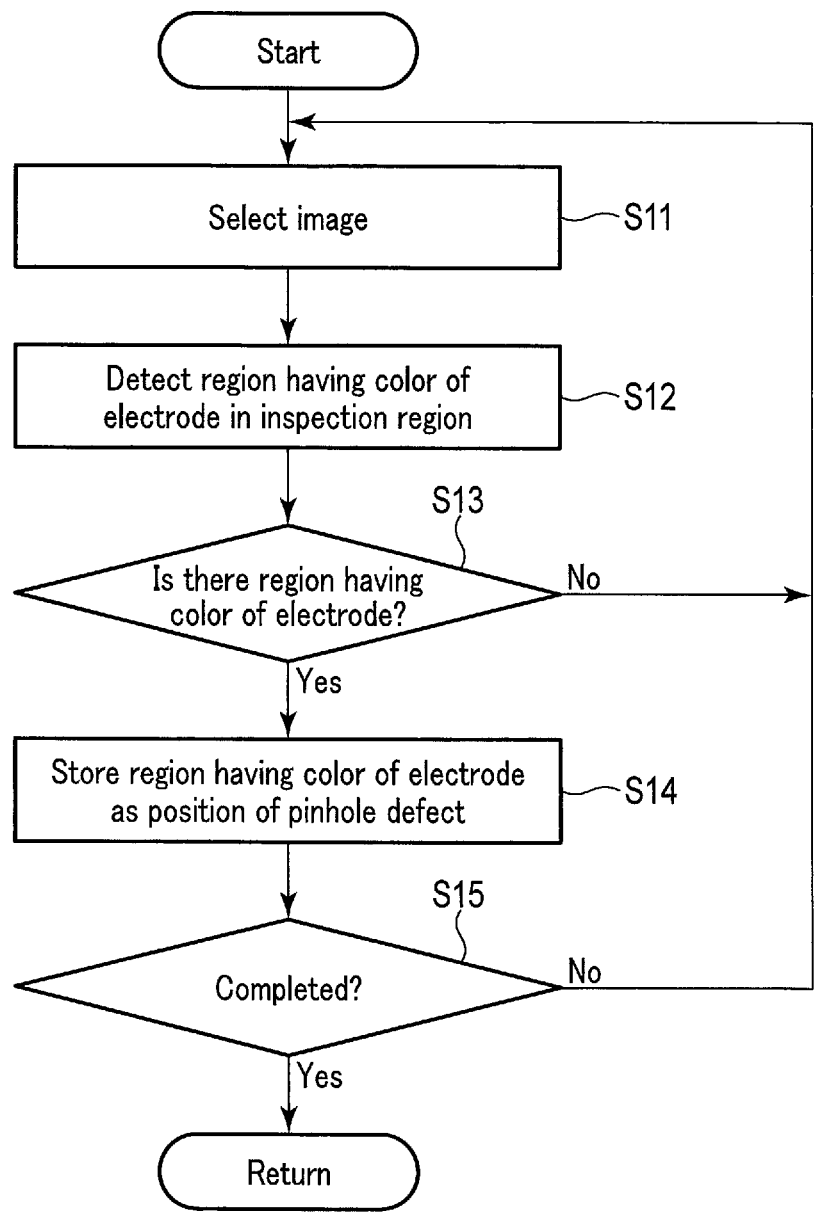
F I G. 5

INSPECTION SYSTEM AND INSPECTION METHOD FOR SECONDARY BATTERY

CROSS-REFERENCE TO RELATED APPLICATIONS

This application is based upon and claims the benefit of priority from the Japanese Patent Application No. 2021-139069, filed Aug. 27, 2021, the entire contents of which are incorporated herein by reference.

FIELD

Embodiments described herein relate generally to an inspection system and an inspection method for a secondary battery.

BACKGROUND

In a secondary battery such as a lithium secondary battery, a porous separator is used so as to avoid a contact between a positive electrode and a negative electrode. For example, a layer of nano-sized organic fibers is used as a separator.

A layer of organic fibers formed on electrodes in a secondary battery may have various defects at the time of manufacture. It is desired that such defects of a layer of organic fibers can be inspected at the stage of manufacture.

BRIEF DESCRIPTION OF THE DRAWINGS

FIG. 5 is a flowchart illustrating defect detection processing according to an embodiment.

DETAILED DESCRIPTION

In general, according to one embodiment, an inspection system for a secondary battery includes an image sensor, a detector, and an inspection processor. The image sensor captures an image of a fiber layer of an electrode structure of a secondary battery. The electrode structure includes an electrode and the fiber layer formed on a surface of the electrode. The electrode includes a current collector and an active material layer. The detector detects a color in data of the image captured with the image sensor. The inspection processor inspects a pinhole defect in the fiber layer based on the color detected with the detector.

Figure 1:
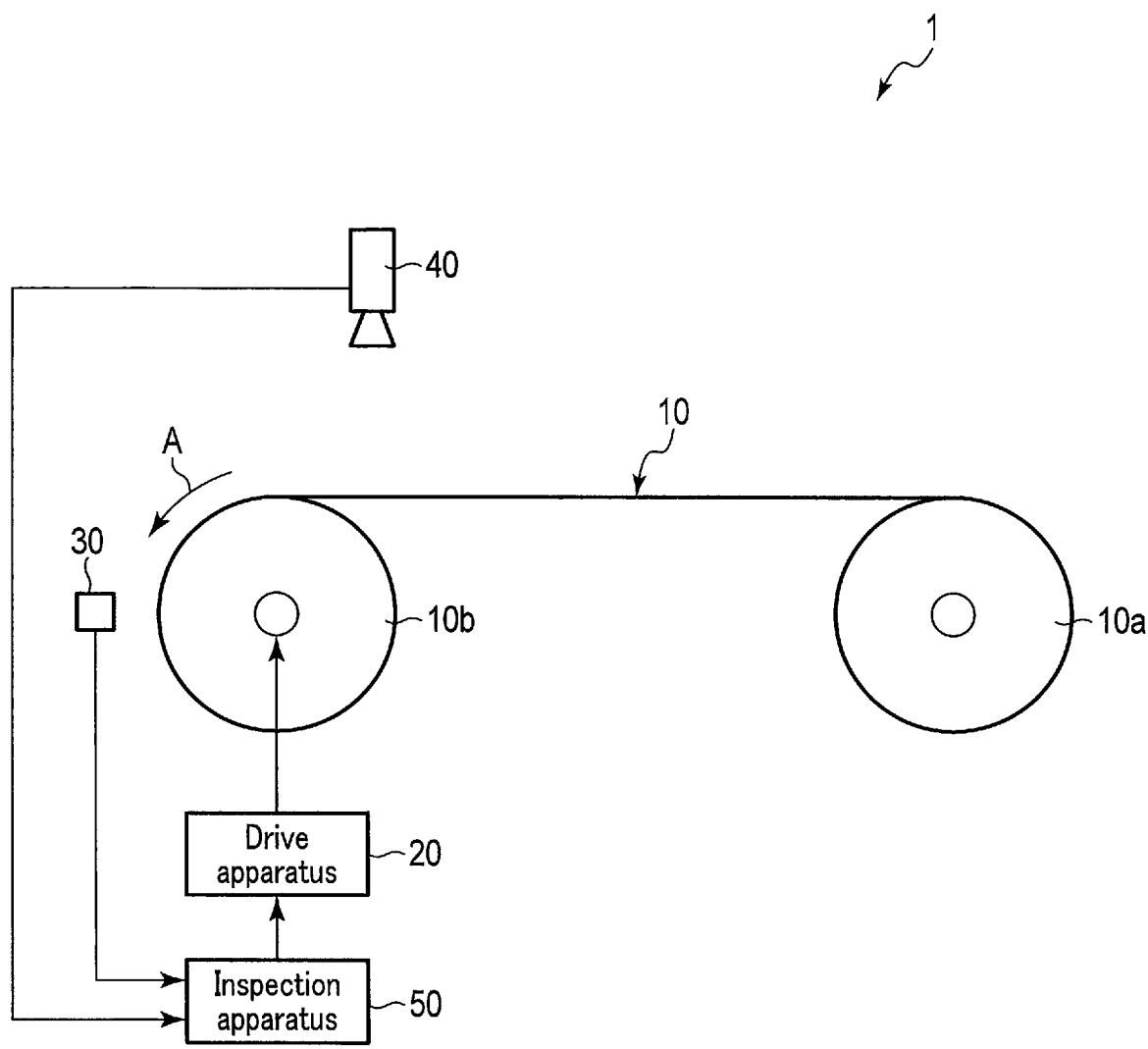
FIG. 1 is a diagram showing an example of an inspection system for a secondary battery according to an embodiment.

Hereinafter, embodiments will be described with reference to the drawings. FIG. 1 is a diagram showing an example of an inspection system for a secondary battery according to an embodiment. An inspection system 1 is a system for inspecting a defect of a fiber layer formed in an electrode sheet 10 manufactured at the stage of manufacturing a secondary battery. The electrode sheet 10 manufactured in the manufacturing stage is put into the inspection system 1 by a roller 10a and conveyed in a direction indicated by the arrow A by a roller 10b. The rollers 10a and 10b are configured to be rotated by, for example, a motor. The electrode sheet 10 forms a battery of an electrode structure included in a secondary battery.

A drive apparatus 20 has drive circuitry for driving the rollers 10a and 10b. The drive circuitry, for example, generates a drive current for driving the motor of the rollers 10a and 10b and supplies the generated drive current to the rollers 10a and 10b.

An encoder 30 is installed near the roller 10b and detects the rotation amount of the roller 10b. The encoder 30 outputs the rotation amount of the roller 10b to an inspection apparatus 50 as a conveyance amount of the electrode sheet 10. The encoder 30 is, for example, an optical encoder which detects the rotation amount of the roller 10b by counting the optical pattern given to the roller 10b. The encoder 30 need not necessarily be an optical encoder. The encoder 30 may be installed near the roller 10a instead of near the roller 10b.

An image sensor 40 is installed above the electrode sheet 10 and captures an image of the electrode sheet 10 to generate imaging data related to the electrode sheet 10. The image sensor 40 may be an image sensor of a complementary metal oxide semiconductor (CMOS) type or an image sensor of a charge coupled device (CCD) type. The image sensor 40 outputs the generated imaging data to the inspection apparatus 50. Herein, the image sensor 40 is a line sensor having pixels arrayed along the width direction of the electrode sheet 10 intersecting the conveyance direction of the electrode sheet 10. The image sensor 40 may have a single line or multiple lines. On the other hand, the pixels of the image sensor 40 in the width direction are preferably arrayed with a width equal to or greater than the width of the electrode sheet 10. Each of the pixels of the image sensor 40 is configured by three sub-pixels in red (R), green (G), and blue (B). Namely, the image sensor 40 is configured to be able to generate a color image. The imaging frame rate of the image sensor 40 is preferably synchronized with the conveyance speed of the electrode sheet 10.

The inspection apparatus 50 inspects the electrode sheet 10 for the presence or absence of a defect as well as the position of a defect based on the conveyance amount of the electrode sheet 10 input from the encoder 30 and the image of the electrode sheet 10 input from the image sensor 40. The inspection apparatus 50 may be configured by a computer, such as a personal computer, including a processor.

Figure 2A:
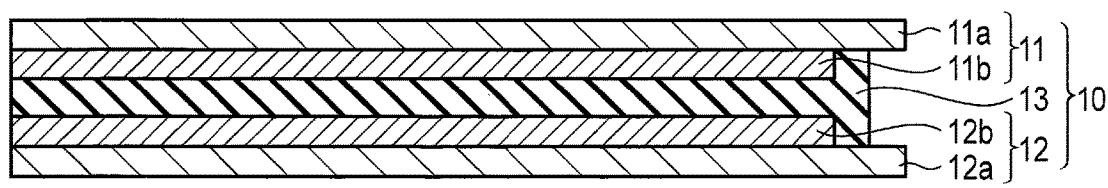
FIG. 2A is a cross-sectional view showing a configuration of an electrode sheet.

FIG. 2A is a cross-sectional view showing the configuration of the electrode sheet 10. The electrode sheet 10 is a sheet member including a positive electrode 11 and a negative electrode 12. The positive electrode 11 and the negative electrode 12 are insulated from each other by a fiber layer 13 as an insulator that includes organic fibers. The fiber layer 13 is not an independent film and is supported by the negative electrode 12. The electrode sheet 10 may be cut into an appropriate length to form a battery of an electrode structure of a secondary battery.

The negative electrode 12 is configured by providing a negative electrode active material layer 12b on a surface of a negative electrode current collector 12a. Likewise, the positive electrode 11 is configured by providing a positive electrode active material layer 11b on a surface of a positive electrode current collector 11a. A foil made of metal such as aluminum is used as the negative electrode current collector 12a and the positive electrode current collector 11a. The negative electrode active material layer 12b is formed using a slurry containing a negative electrode active material, a negative electrode conductive agent, and a binder. The positive electrode active material layer 11b is formed using a slurry containing a positive electrode active material, a positive electrode conductive agent, and a binder.

For example, lithium titanate may be used as the negative electrode active material. Examples of the lithium titanate include $Li_{4+x}Ti_5O_{12}$ ($0 \leq x \leq 3$) having a spinel structure and $Li_{2+y}Ti_3O_7$ ($0 \leq y \leq 3$) having a ramsdellite structure. An average particle size of the primary particles of the negative electrode active material is preferably in a range of 0.001 μm to 1 μm. The shape of the particles may be a granular shape or a fibrous shape. In the case of the fibrous shape, the fiber diameter is preferably 0.1 μm or less.

For example, acetylene black, carbon black, graphite, etc., may be used as the negative electrode conductive agent. For example, polytetrafluoro-ethylene (PTFE), polyvinylidene fluoride (PVdF), fluorine rubber, styrene-butadiene rubber, etc., may be used as the binder for binding the negative electrode active material and the negative electrode conductive agent.

A general lithium transition metal composite oxide may be used as the positive electrode active material. For example, $LiCoO_2$, $LiNi_{1-x}Co_xO_2$ ($0<x<0.3$), $LiMn_xNi_y$-$Co_zO_2$ ($0<x<0.5$, $0<y<0.5$, $0 \leq z<0.5$), $LiMn_{2-x}M_xO_4$ (M is Li, Mg, Co, Al, or Ni, $0<x<0.2$), $LiMPO_4$ (M is Fe, Co, or Ni), etc., may be used.

For example, carbonaceous materials such as acetylene black, carbon black, and graphite may be used as the positive electrode conductive agent. For example, polytetrafluoro-ethylene (PTFE), polyvinylidene fluoride (PVdF), fluorine rubber, etc., may be used as the binder.

The fiber layer 13 is lithium-ion conductive and acts as an electrically insulating separator. The fiber layer 13 may be directly formed on a surface of the negative electrode 12 or the positive electrode 11 by using a solution of an organic material as a basic material and using, for example, an electrospinning method, an inkjet method, a jet dispenser method, a spray coating method, or the like. Herein, the fiber layer 13 also covers the edges of the negative electrode active material layer 12b of the negative electrode 12 and the positive electrode active material layer 11b of the positive electrode 11. On the other hand, the edges of the negative electrode current collector 12a of the negative electrode 12 and the positive electrode current collector 11a of the positive electrode 11 are not covered with the fiber layer 13 and project from the fiber layer 13. Such a configuration suppresses generation of a short circuit caused by the misalignment of the electrode surfaces and the cutting of the electrodes or the current collectors. Moreover, since the edges of the electrodes are covered with an insulator including the fiber layer 13, generation of a short circuit at the edges is avoided, allowing for enhancement of the safety of the battery. Covering the edges of the electrodes with an insulator including the fiber layer 13 also leads to improvement of self-discharge characteristics.

For example, a solution prepared by dissolving an organic material in a solvent is used for electrospinning. The organic material can be selected from, for example, the group consisting of polyamide imide, polyamide, polyolefin, polyether, polyimide, polyketone, polysulfone, cellulose, polyvinyl alcohol (PVA), and polyvinylidene fluoride (PVdF). Examples of the polyolefin include polypropylene (PP) and polyethylene (PE).

Figure 2B:
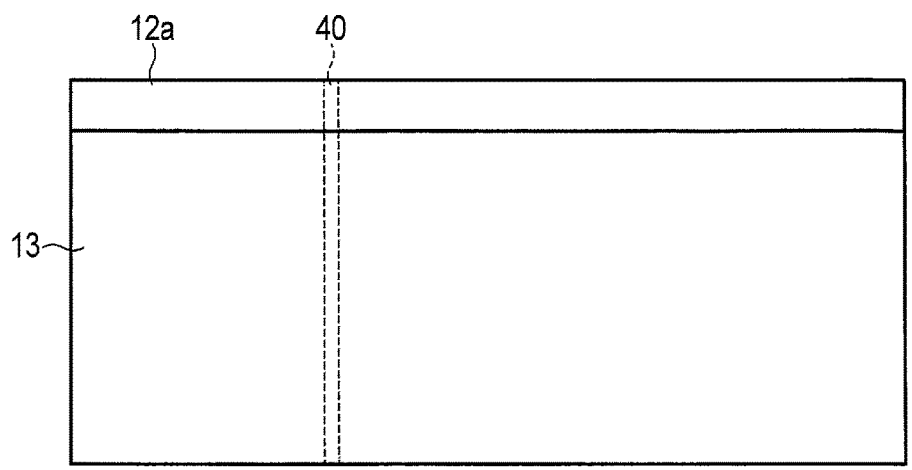
FIG. 2B is a diagram showing a state of the electrode sheet at the time of inspection of a fiber layer.

FIG. 2B is a diagram showing a state of the electrode sheet 10 at the time of inspection of the fiber layer 13. FIG. 2B shows a state of the electrode sheet 10 viewed from the side closest to the image sensor 40 in FIG. 1. In FIG. 2B, it is assumed that the fiber layer 13 is formed on the negative electrode 12. In the embodiment, when the formation of the fiber layer 13 is completed in the manufacturing stage, the electrode sheet 10 is put into the inspection system 1 via the roller 10a before the positive electrode 11 is formed. Namely, the electrode sheet 10 is put in such that the fiber layer 13 is exposed when viewed from the image sensor 40. The image sensor 40 captures an image of the electrode sheet 10 from the side closest to the fiber layer 13 at a frame rate synchronized with the conveyance speed of the electrode sheet 10. The image sensor 40 then outputs the imaging data to the inspection apparatus 50. Imaging data obtained when the image sensor 40 is a single-line sensor is data corresponding to a single line of the electrode sheet 10, in which each of the pixels has brightness values of R, G, and B. In each single line, the imaging data captured with the image sensor 40 may include a first region of the electrode 12 and a second region of the fiber layer 13.

Figure 3:
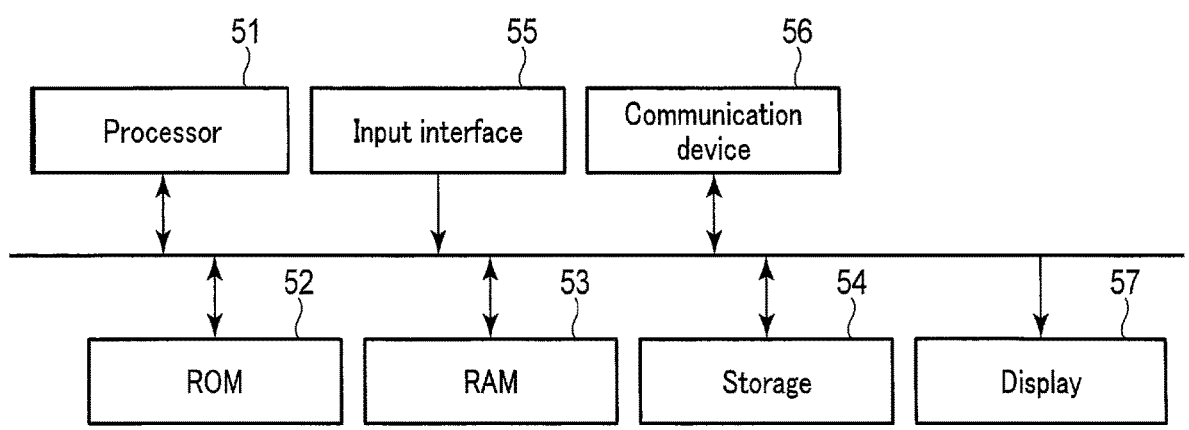
FIG. 3 is a diagram showing a hardware configuration of an inspection apparatus.

FIG. 3 is a diagram showing a hardware configuration of the inspection apparatus 50. The inspection apparatus 50 may be a terminal device of various types, such as a personal computer (PC) or a tablet terminal. As shown in FIG. 3, the inspection apparatus 50 includes, as hardware, a processor 51, a ROM 52, a RAM 53, a storage 54, an input interface 55, a communication device 56, and a display 57.

The processor 51 is a processor that controls the entire operation of the inspection apparatus 50. The processor 51 is, for example, a central processing unit (CPU). The processor 51 may be, for example, a micro-processing unit (MPU), a graphics processing unit (GPU), an application specific integrated circuit (ASIC), a field programmable gate array (FPGA), etc. The processor 51 may be a single CPU, etc., a plurality of CPUs, etc.

A read-only memory (ROM) 52 is a non-volatile memory. The ROM 52 stores an activation program, etc., of the inspection apparatus 50. A random access memory (RAM) 53 is a volatile memory. The RAM 53 is used as, for example, a working memory during processing at the processor 51.

The storage 54 is, for example, a storage such as a hard disk drive or a solid-state drive. The storage 54 stores various types of programs executed by the processor 51, such as an inspection program that has processor 51 perform as an inspection processor.

The input interface 55 includes input devices such as a touch panel, a keyboard, and a mouse. When an operation of an input device of the input interface 55 is performed, a signal corresponding to the operation matter is input to the processor 51. The processor 51 performs various types of processing, such as an inspection process, in response to this signal.

The communication device 56 is a communication device that allows the inspection apparatus 50 to communicate with external devices such as the encoder 30 and the image sensor 40. The communication device 56 may be a communication device for either wired or wireless communication devices.

The display 57 is a display such as a liquid crystal display or an organic EL display. The display 57 displays various images. The display 57 may be provided separately from the inspection apparatus 50.

Figure 4:
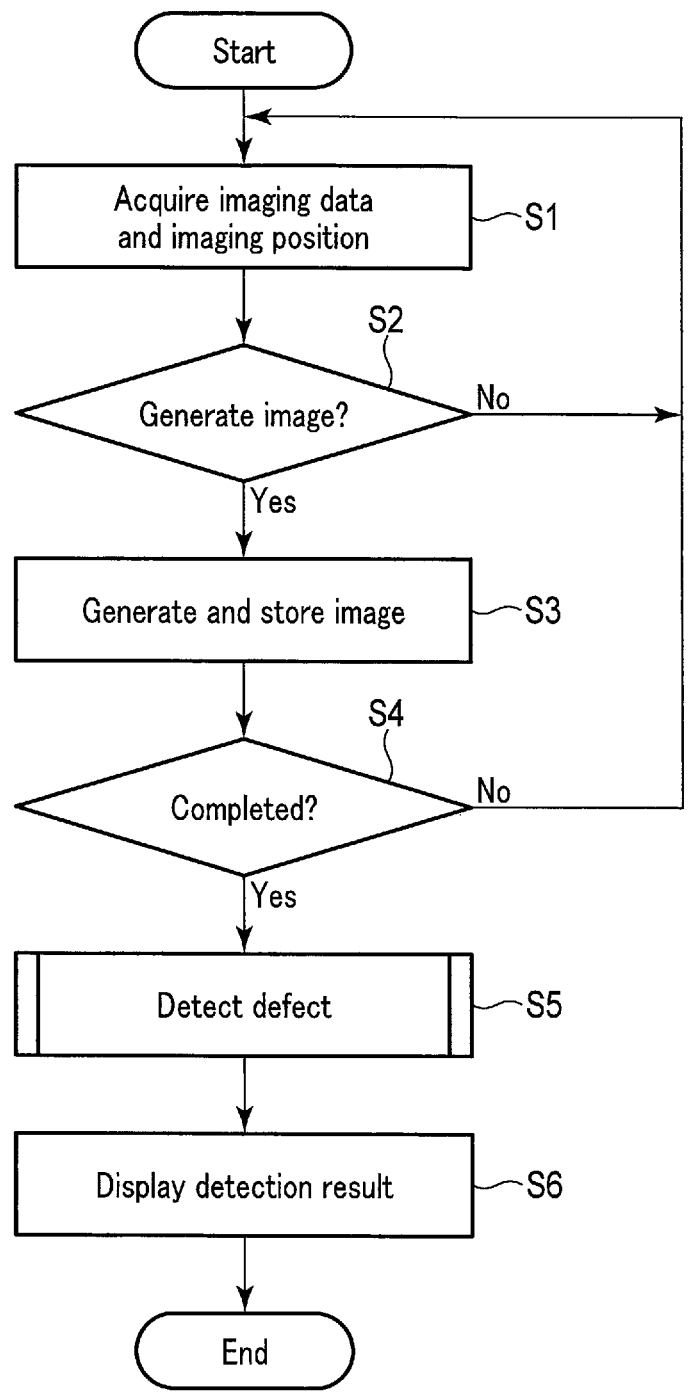
FIG. 4 is a flowchart illustrating an operation of the inspection apparatus.

FIG. 4 is a flowchart illustrating an operation of the inspection apparatus 50. The operation illustrated in FIG. 4 is implemented by the processor 51. During the operation illustrated in FIG. 4, the electrode sheet 10 is conveyed by the rollers 10a and 10b. The encoder 30 detects the rotation amount of the roller 10b every a certain period, and outputs the detected rotation amount to the inspection apparatus 50 as a conveyance amount of the electrode sheet 10. The image sensor 40 also performs imaging in synchronization with the conveyance of the electrode sheet 10 and outputs the imaging data to the inspection apparatus 50.

In step S1, the processor 51 computes the imaging position of the image sensor 40 based on the conveyance amount of the electrode sheet 10 obtained from the encoder 30. The imaging position is a position of the electrode sheet 10 imaged by the image sensor 40. If the length of the manufactured electrode sheet 10 is fixed and the conveyance speed of the rollers 10a and 10b are constant, the imaging position of the image sensor 40 can be computed from the conveyance amount. The processor 51 acquires imaging data from the image sensor 40 and stores the acquired imaging data and the computed imaging position in, for example, the RAM 53 in such a manner as to associate them with each other.

In step S2, the processor 51 determines whether or not to generate an image from the imaging data. For example, it is determined to generate an image when imaging data having a sufficient number of lines to form an image is stored in the RAM 53. The number of lines needed for an image to be formed is determined, for example, according to a screen size of the display 57. When it is not determined that an image is to be generated in step S2, the process returns to step S1. In this case, the processor 51 continues to acquire the imaging data and the imaging position. When it is determined that an image is to be generated in step S2, the process proceeds to step S3.

In step S3, the processor 51 generates an image by combining imaging data of each line. The processor 51 stores the generated image in, for example, the storage 54.

In step S4, the processor 51 determines whether or not the imaging of the electrode sheet 10 has been completed. For example, when the conveyance amount exceeds a threshold, it is determined that the imaging of the electrode sheet 10 has been completed. When it is not determined that the imaging of the electrode sheet 10 has been completed in step S4, the process returns to step S1. When it is determined that the imaging of the electrode sheet 10 has been completed in step S4, the process proceeds to step S5.

In step S5, the processor 51 performs defect detection processing (inspection processing). In the other words, the processor 51 is an inspection processor in this embodiment to perform the inspection processing such as the defect detection processing. The defect detection processing is processing of detecting a defect in the fiber layer 13 of the electrode sheet 10 from the image. After the defect detection processing, the process proceeds to step S6. The defect detection processing will be detailed later.

In step S6, the processor 51 displays the result of the detection of a defect on the display 57. The processor 51 then terminates the process illustrated in FIG. 4. For example, the processor 51 displays an image showing detection of a defect in the fiber layer 13 on the display 57. The processor 51 may highlight the position of the defect or further display information on the defect such as the number of defects.

FIG. 5 is a flowchart illustrating the defect detection processing according to the embodiment. In the embodiment, a pinhole defect is detected as a defect of the fiber layer 13. The pinhole defect is a through-hole generated at the stage of producing the fiber layer 13.

In step S11, the processor 51 selects a single image from the images stored in the storage 54. For example, the processor 51 selects an image in the order of storing the images in the storage 54.

In step S12, the processor 51 sets an inspection region and detects a region having the color of the electrodes in the inspection region. In this embodiment, the processor 51 is also a detector configured to detect a color in data of the image generated in the imaging of the electrode sheet 10. Alternatively, the detector can be separately provided with processor 51. For clarity, the scope of the invention includes an embodiment where the detector and the inspection processor are in processor 51, namely, the detector and the inspection processor are configured as one element, such as processor 51 in FIG. 3.

Figure 6A:
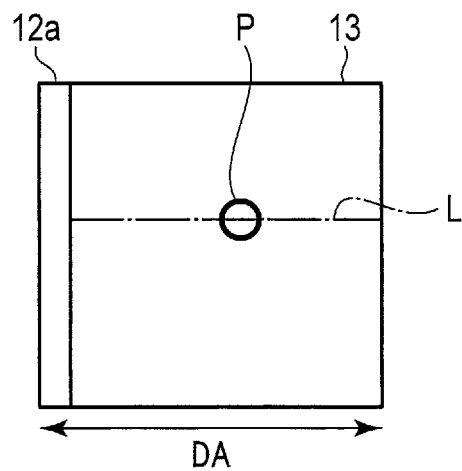
FIG. 6A is a diagram showing an inspection region.

The processing of step S12 will be described. FIG. 6A is a diagram showing the inspection region. As shown in FIG. 6A, an inspection region DA is a region of the fiber layer 13 (the second region in each single line of the imaging data, as described above), and is set in an image in the present embodiment. If the negative electrode current collector 12a is produced without an error at the stage of producing the electrode sheet 10, the starting position of the inspection region DA in the width direction can be determined by the distance from the edge of the negative electrode current collector 12a to the edge of the fiber layer 13. In an actual case, some degree of margin may be included in the starting position of the inspection region DA in the width direction in consideration of, for example, an error in the production of the negative electrode current collector 12a.

Figure 6B:
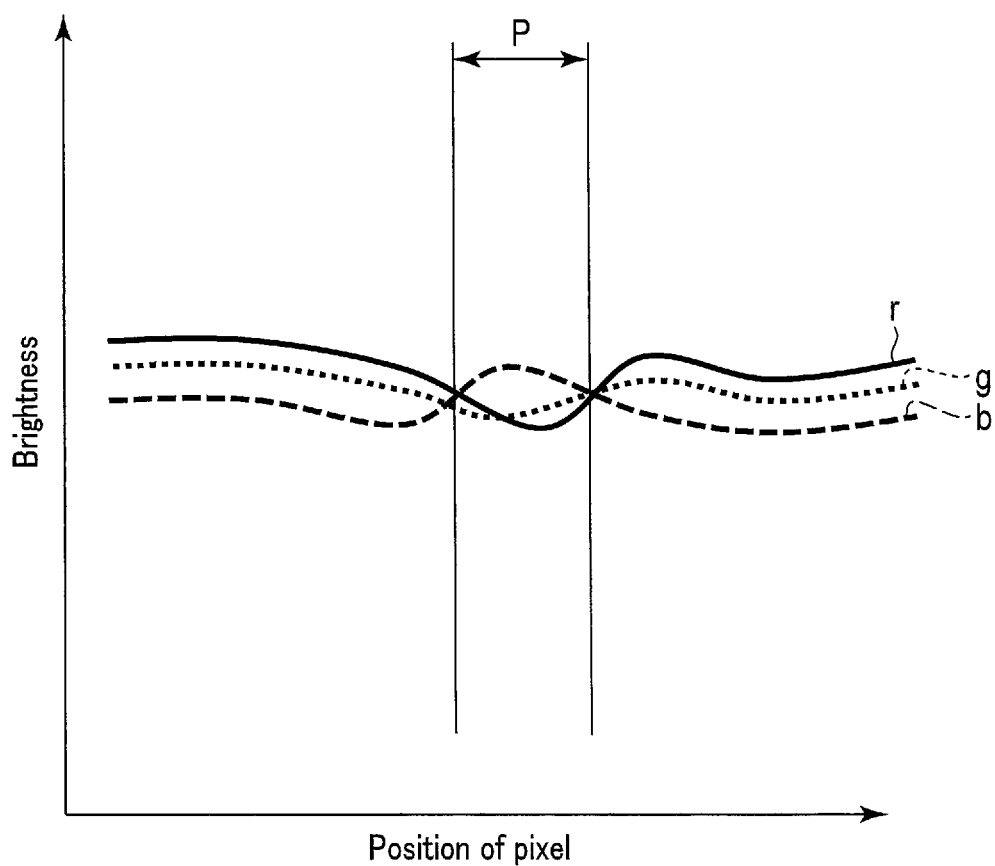
FIG. 6B is a graph of a value of the brightness along the line L shown in FIG. 6A.

It is assumed that in FIG. 6A a pinhole defect P is formed in the fiber layer 13. Since the pinhole defect P is a through-hole, as mentioned above, the negative electrode active material layer 12b below the fiber layer 13 is visible through the pinhole defect P when the pinhole defect P is viewed from above. FIG. 6B is a graph of the value of the brightness along the line L shown in FIG. 6A. In FIG. 6B, the horizontal axis represents the position of the pixels along the line L, and the vertical axis represents the value of the brightness. The point of origin in the horizontal axis in FIG. 6B is set in a position of the edge of the negative electrode current collector 12a, that is, the starting position of the inspection region DA. Graph r is a graph of the value of the brightness of the sub-pixel R, graph g is a graph of the value of the brightness of the sub-pixel G, and graph b is a graph of the value of the brightness of the sub-pixel B. The position of the pixels in the range of P in FIG. 6B is the position of the pixels in the range of the pinhole defect P in FIG. 6A.

In the positions of the pixels other than those in the range of the pinhole defect P, the values of the brightness of the pixel R and the pixel G are higher than the value of the brightness of the pixel B, as shown in FIG. 6B. Namely, the color of the pixels represents an approximately yellow color. This is the color of the organic material used in the fiber layer 13. On the other hand, in the positions of the pixels in the range of the pinhole defect P, the value of the brightness of the pixel B is higher than the values of the brightness of the pixel R and the pixel G. Namely, the color of the pixels represents an approximately blue color. This is the color of lithium titanate used in the negative electrode active material layer 12b.

As explained above, generation of the pinhole defect P in the fiber layer 13 causes a color change on the image.

Therefore, the processor 51 detects the pinhole defect P as the region (a pinhole region) having the color of the electrode (an active-material-layer color) in the inspection region DA by detecting, particularly in the present embodiment, a blue region specific to lithium titanate, which is a negative electrode active material used in the negative electrode active material layer 12b of the negative electrode current collector 12a. The blue region in the inspection region DA is, for example, a region in which the value of the brightness of the pixel B is equal to or greater than a threshold, as compared to the value of the brightness of the pixel R and the value of the brightness of the pixel G. The processor 51 detects the region in which the value of the brightness of the pixel B is equal to or greater than a threshold, as compared to the value of the brightness of the pixel R and the value of the brightness of the pixel G while, for example, scanning the image line by line. That is, in the present embodiment, the processor 51 detects the region having the color of the negative electrode active material layer 12b generated in the pinhole defect P in the inspection region DA (in the present embodiment, the color of said region is blue but is not limited thereto) based on the brightness of the three sub-pixels of the pixel R, pixel G, and pixel B.

Referring back to FIG. 5, a further description will be given. In step S13, the processor 51 determines whether or not the image has a region having the color of the electrodes. When it is determined that the image has a region having the color of the electrodes in step S13, the process proceeds to step S14. When it is determined that the image has no region having the color of the electrodes in step S13, the process proceeds to step S15.

In step S14, the processor 51 stores the region having the color of the electrodes as the position of the pinhole defect, for example, in the storage 54 in such a manner as to associate it with the image. The process then proceeds to step S15.

In step S15, the processor 51 determines whether or not the processing of detecting the pinhole defect has been completed for all the images. When it is determined that the processing of detecting the pinhole defect has not been completed for all the images in step S15, the process returns to step S11. When it is determined that the processing of detecting the pinhole defect has been completed for all the images in step S15, the processor 51 terminates the process illustrated in FIG. 5.

As described above, according to the embodiment, the electrode sheet can be inspected for the presence or absence of the pinhole defect in the fiber layer based on a color change in the image. Namely, in the embodiment, the presence or absence of the pinhole defect can be investigated with the simple structure of using only the image sensor. Also, in the embodiment, the inspection can be performed by putting the electrode sheet into an inspection sheet at the stage where formation of the fiber layer is completed. That is, the inspection can be performed at the stage of producing the electrode sheet.

Modification of Embodiment

Figure 7:
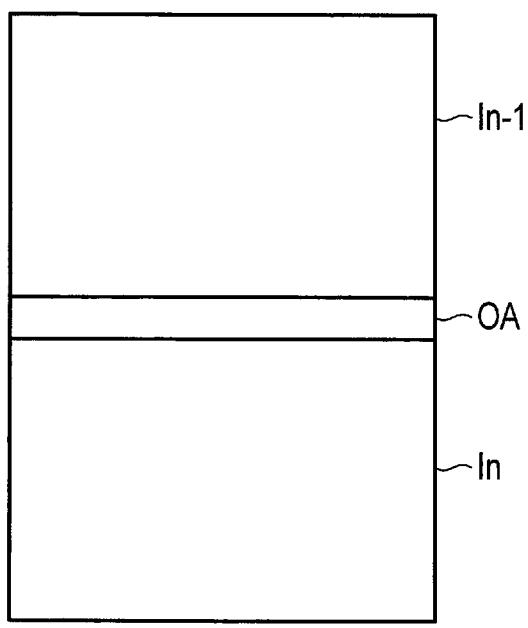
FIG. 7 is a diagram showing an example of generating an image according to a modification.

Hereinafter, a modification of the embodiment will be described. FIG. 7 is a diagram showing an example of generating an image according to a modification. In the modification, an image In and an image In−1 of two consecutive frames are generated so that there will be an overlapping region OA in the boundary between the image In and the image In−1, as shown in FIG. 7. For example, the number of lines of the overlapping region OA may be set so as to include a possible maximum pinhole defect. The number of lines of the overlapping region OA may include some degree of margin.

Figure 8:
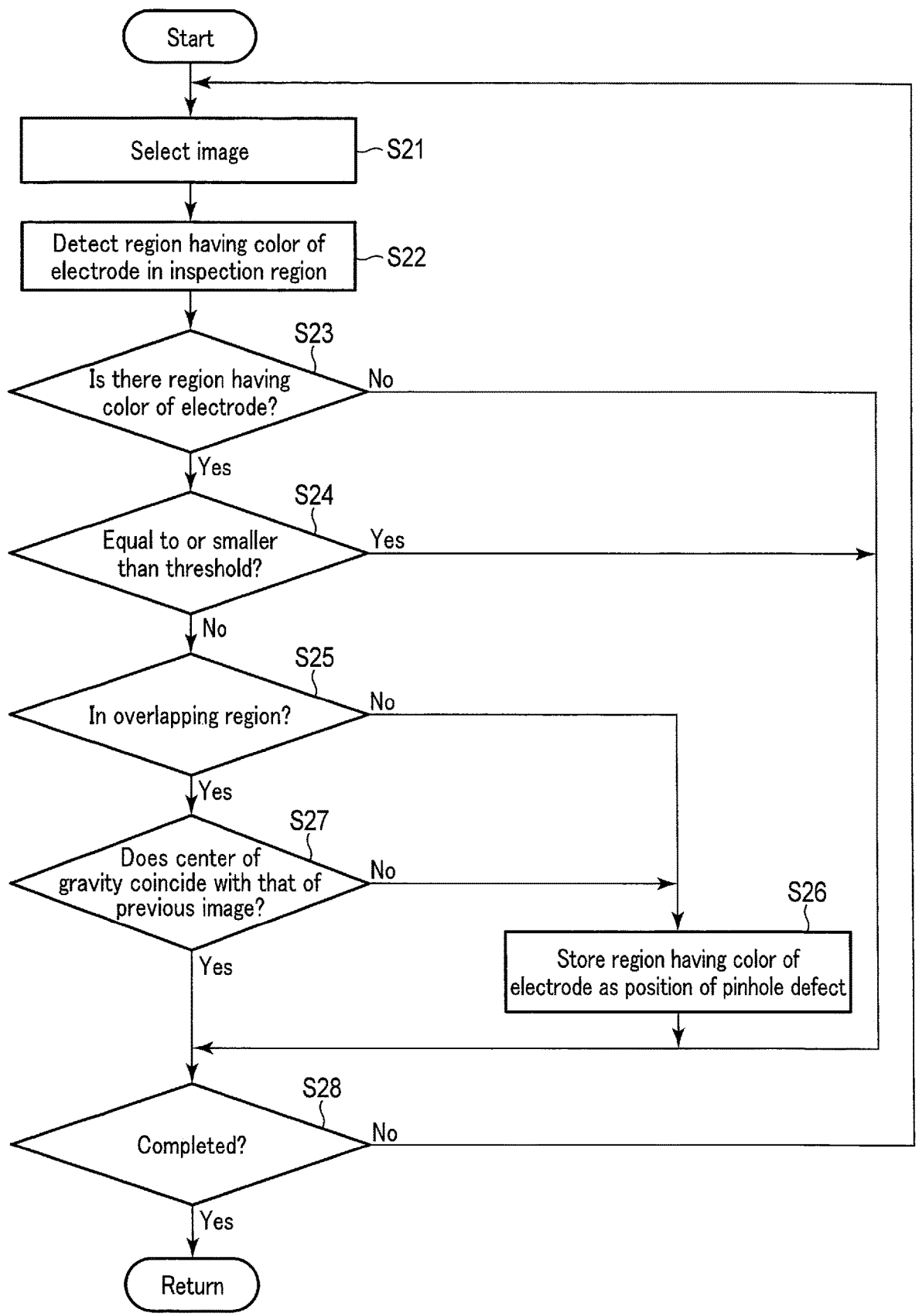
FIG. 8 is a flowchart illustrating defect detection processing according to a modification of the embodiment.

FIG. 8 is a flowchart illustrating defect detection processing according to the modification of the embodiment. In step S21, the processor 51 selects a single image from the images stored in the storage 54. For example, the processor 51 selects an image in the order of storing the images in the storage 54.

In step S22, the processor 51 sets an inspection region in the image and detects a region having the color of the electrodes in the inspection region. The detection of the region having the color of the electrodes may be performed according to the same method as described in the above embodiment.

In step S23, the processor 51 determines whether or not the image has a region having the color of the electrodes. When it is determined that the image has a region having the color of the electrodes in step S23, the process proceeds to step S24. When it is determined that the image has no region having the color of the electrodes in step S23, the process proceeds to step S28.

In step S24, the processor 51 determines whether or not the area of the region having the color of the electrodes is equal to or smaller than a threshold. The threshold is an opening area of a possible minimum pinhole defect. When it is determined that the area of the region having the color of the electrodes is not equal to or smaller than a threshold in step S24, the process proceeds to step S25. When it is determined that the area of the region having the color of the electrodes is equal to or smaller than a threshold in step S24, the process proceeds to step S28. In the modification, the region having the color of the electrodes having an area equal to or smaller than a threshold is not regarded as a pinhole defect, and is not stored, either.

In step S25, the processor 51 determines whether or not the region having the color of the electrodes is in the overlapping region. When it is determined that the region having the color of the electrodes is not in the overlapping region in step S25, the process proceeds to step S26. When it is determined that the region having the color of the electrodes is in the overlapping region in step S25, the process proceeds to step S27.

In step S26, the processor 51 stores the region having the color of the electrodes as the position of the pinhole defect in the storage 54 in such a manner as to associate it with the image. The process then proceeds to step S28.

In step S27, the processor 51 computes the center of the region having the color of the electrodes detected in the overlapping region. The processor 51 then determines whether or not the center of the region having the color of the electrodes detected in the overlapping region of the image of a current frame corresponds with the center of the region having the color of the electrodes detected in the overlapping region of the image of a previous frame. In one embodiment, the center of the region having the color of the electrodes can be calculated as a position of the center in the region. When it is determined in step S27 that the center of the region having the color of the electrodes detected in the overlapping region of the image of a current frame does not coincide (or is not in the predetermined distance) with the center of the region having the color of the electrodes detected in the overlapping region of the image of a previous frame, the process proceeds to step S26 as these centers in the overlapping region in adjacent frames are not corresponding (or coinciding). When it is determined in step S27 that the center of gravity of the region having the color of the electrodes detected in the overlapping region of the image of a current frame coincides (or is in the predetermined distance) with the center of gravity of the region having the color of the electrodes detected in the overlapping region of the image of a previous frame, the process proceeds to step S28 as these centers in the overlapping region in adjacent frames are corresponding (or coinciding). Namely, in the embodiment, when the region having the color of the electrodes is detected in the overlapping region, only when the center (of gravity) of the region having the color of the electrodes detected in the overlapping region of the image of a current frame does not coincide or corresponds with the center (of gravity) of the region having the color of the electrodes detected in the overlapping region of the image of a previous frame, the region having the color of the electrodes detected in the overlapping region of the image of a current frame is stored as a pinhole defect.

In step S28, the processor 51 determines whether or not the processing of detecting the pinhole defect has been completed for all the images. When it is determined that the processing of detecting the pinhole defect has not been completed for all the images in step S28, the process returns to step S21. When it is determined that the processing of detecting the pinhole defect has been completed for all the images in step S28, the processor 51 terminates the process shown in FIG. 8.

Figure 9A:
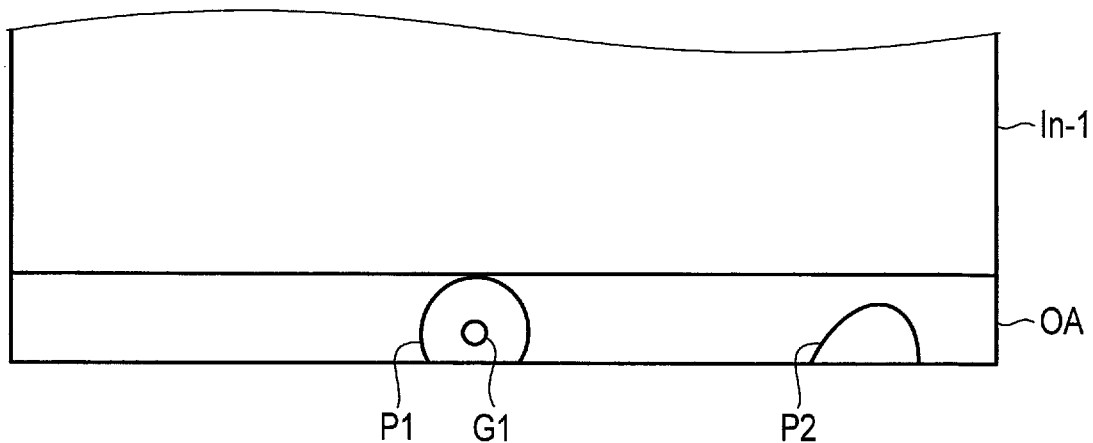
FIG. 9A is a diagram for explaining the defect detection processing of the modification.
Figure 9B:
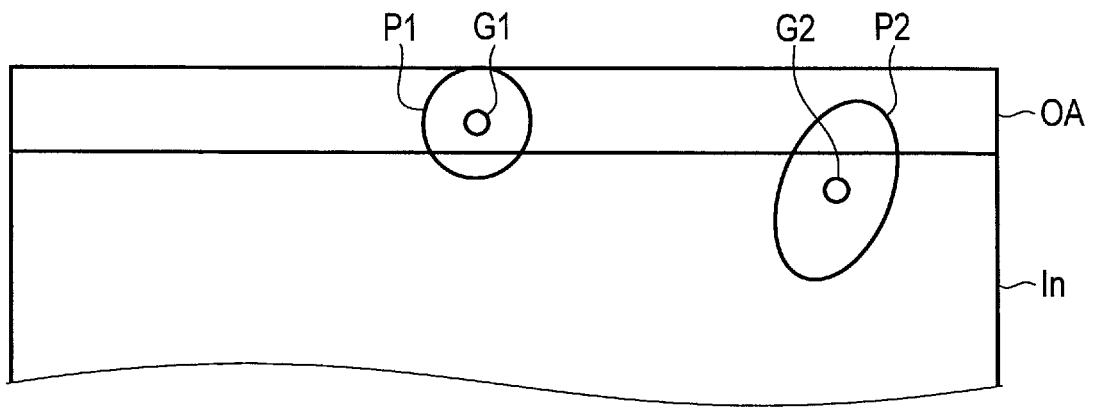
FIG. 9B is a diagram for explaining the defect detection processing of the modification.

FIGS. 9A and 9B are diagrams for explaining the defect detection processing of the modification. FIG. 9A is a diagram showing the case where the region having the color of the electrodes is detected near the overlapping region OA of the image In−1. FIG. 9B is a diagram showing the case where the region having the color of the electrodes is detected near the overlapping region OA of the image In.

It is assumed that regions P1 and P2 having the color of the electrodes are detected in the overlapping region OA in the image In−1, as shown in FIG. 9A. Most of the region P1 having the color of the electrodes is shown in the image In−1. Thus, the area of the region P1 having the color of the electrodes is larger than a threshold, and, as a result, the region P1 having the color of the electrodes is stored in the storage as a pinhole defect. On the other hand, only a part of the region P2 having the color of the electrodes is shown in the image In−1. Thus, the area of the region P2 having the color of the electrodes is equal to or smaller than a threshold, and, as a result, the region P2 having the color of the electrodes is not stored in the storage as a pinhole defect.

In FIG. 9B as well, it is assumed that regions P1 and P2 having the same color of the electrodes as that of the image In−1 are detected in the overlapping region OA of the image In. The area of the region P1 having the color of the electrodes is larger than a threshold, but the centers of gravity G1 coincide with each other. The centers of gravity coinciding in the overlapping region OA of the image In−1 and the image In means that the regions having the color of the electrodes of those images are the same region and the same pinhole defect. Thus, the region P1 having the color of the electrodes is not stored in the storage as a pinhole defect. Further, most of the region P2 having the color of the electrodes is shown in the image In. Thus, the area of the region P2 having the color of the electrodes is larger than a threshold. The center of gravity of the region P2 having the color of the electrodes in the image In−1 does not coincide with the center of gravity G2 of the region P2 having the color of the electrodes in the image In. As a result, the region P2 having the color of the electrodes is stored in the storage as a pinhole defect.

As described above, in the modification, even if pinhole defects are shown across multiple images, these pinhole defects can be detected as a single pinhole defect.

Other Modifications

In the above-described embodiment, a blue region is detected as the region having the color of the electrodes in the inspection region. This is because the color of lithium titanate used in the negative electrode active material layer 12b on which the fiber layer 13 is formed is blue. On the other hand, the fiber layer 13 may also be formed on the positive electrode active material layer 11b of the positive electrode 11. Even in this case, the technique described in the embodiment may be applied. When the fiber layer 13 is formed on the positive electrode active material layer 11b, the processor 51 detects the color of the positive electrode active material layer 11b in the inspection region as the region having the color of the electrode. For example, when the aforementioned lithium transition metal composite oxide is used as the positive electrode active material layer lib, the processor 51 detects a black region. Namely, the processor 51 can detect, as a pinhole defect, the region having the color of the layer on which the fiber layer 13 is formed.

In the above-described embodiment, the electrode sheet 10 conveyed by the rollers 10a and 10b is imaged by the stationary image sensor 40. In contrast, the position of the electrode sheet 10 may be fixed so that the image sensor 40 can scan the electrode sheet 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An inspection system for a secondary battery, the inspection system comprising:
an image sensor configured to capture an image of a fiber layer of an electrode structure of a secondary battery, the electrode structure comprising an electrode and the fiber layer formed on a surface of the electrode, the electrode comprising a current collector and an active material layer;
a detector configured to detect a color in data of the image captured with the image sensor; and
an inspection processor configured to inspect a pinhole defect in the fiber layer based on the color detected with the detector, wherein
the image captured with the image sensor includes a first region of the electrode and a second region of the fiber layer, and
the inspection processor is configured to:
set the second region as an inspection region; and
detect a pinhole region having an active-material-layer color of the active material layer in the image in the inspection region, as the pinhole defect,
the image sensor is configured to scan the electrode structure line by line to capture the image, and the inspection processor is configured to:

set an overlapping region at a boundary between consecutive first and second images obtained by the image sensor;

determine the pinhole region having the active-material-layer color detected in the overlapping region of the second image as not being the pinhole region of the pinhole defect with a condition where the pinhole region having the active-material-layer color in the overlapping region of the first image corresponds with the pinhole region having the active-material-layer color in the overlapping region of the second image; and detect, as the pinhole region having the active-material-layer color, a region in which a brightness of blue sub-pixels of the image in the inspection region is equal to or greater than a brightness of red and green sub-pixels.

2. The inspection system for a secondary battery according to claim 1, wherein the inspection processor is configured to detect the pinhole region having the active-material-layer color based on a brightness of red, green, and blue sub-pixels constituting pixels of the image.

3. The inspection system for a secondary battery according to claim 1, wherein the inspection processor is configured to detect an area having the active-material-layer color equal to or greater than a threshold, as the pinhole region.

4. The inspection system for a secondary battery according to claim 1, wherein the image sensor is a line sensor having pixels arrayed along a width direction of the electrode structure.

5. An inspection method for a secondary battery, the method comprising:

capturing an image of a fiber layer of an electrode structure of a secondary battery, the electrode structure comprising an electrode and the fiber layer formed on a surface of the electrode, the electrode comprising a current collector and an active material layer;

detecting a color in data of the image; and inspecting a pinhole defect in the fiber layer based on the color detected in the data, wherein the image includes a first region of the electrode and a second region of the fiber layer;

setting the second region as an inspection region;

detecting a pinhole region having an active-material-layer color of the active material layer in the image in the inspection region, as the pinhole defect;

scanning the electrode structure line by line to capture the image;

setting an overlapping region at a boundary between consecutive first and second images;

determining the pinhole region having the active-material-layer color detected in the overlapping region of the second image as not being the pinhole region of the pinhole defect with a condition where the pinhole region having the active-material-layer color in the overlapping region of the first image corresponds with the pinhole region having the active-material-layer color in the overlapping region of the second image; and detecting, as the pinhole region having the active-material-layer color, a region in which a brightness of blue sub-pixels of the image in the inspection region is equal to or greater than a brightness of red and green sub-pixels.

* * * * *